United States Patent

Hampel et al.

[15] 3,671,783

[45] June 20, 1972

[54] SAMPLE AND HOLD CIRCUIT

[72] Inventors: Daniel Hampel, Westfield; Joseph Bryan Lerch, North Brunswick, both of N.J.

[73] Assignee: The United States of America as represented by the Secretary of the Air Force

[22] Filed: June 15, 1971

[21] Appl. No.: 153,309

[52] U.S. Cl. ..............................307/238, 307/235, 328/151, 307/259

[51] Int. Cl. ........................................B03k 5/00, H03k 5/20

[58] Field of Search ..................328/151; 307/238, 256, 257, 307/248, 235

[56] References Cited

UNITED STATES PATENTS

| | | | |
|---|---|---|---|
| 2,443,195 | 6/1948 | Pensyl | 307/257 |
| 2,458,599 | 1/1949 | Hussey | 328/151 |
| 3,388,270 | 6/1968 | Davidoff | 307/257 |

*Primary Examiner*—Donald D. Forrer
*Assistant Examiner*—B. P. Davis
*Attorney*—Harry A. Herbert, Jr. et al.

[57] ABSTRACT

A balanced sample and hold circuit in which a pair of transistors control the bias on a pair of diodes and these transistors are activated by pulses applied to the bases thereof. The diodes connect the input signals to the output terminals and there is a holding capacitor in shunt with the output terminals. Resistors are connected across the input terminal to provide a load when the circuit is in the off condition.

2 Claims, 2 Drawing Figures

INVENTORS
DANIEL HAMPEL
JOSEPH B. LERCH
BY Harry A. Herbert Jr and
Julian L. Siegel
ATTORNEYS

SAMPLE AND HOLD CIRCUIT

BACKGROUND OF THE INVENTION

High speed sample and hold gates for use with analog-to-digital converters have generally used quad diode gates. These gates either require balanced NPN AND PNP current drive sources or a single transistor driven pulse transformer. This invention discloses a gate circuit that uses only two diodes and does not require both NPN and PNP transistors or pulse transformers for drive. It thereby makes the circuit more advantageously used for monolithic integration. The balanced nature of this circuit offers a high degree of common mode noise rejection. Since amplifiers can be made with double-ended inputs as well as double-ended outputs, the circuit has little additional input and output amplifier requirements.

SUMMARY OF THE INVENTION

The present invention is an improvement over the prior art quad diode sample and hold circuit which uses four diodes and two current driving transistors of opposite polarity types that require complementary sample pulses and have no common mode rejection. The invention presented here uses only two diodes with current driving transistors of the same polarity type. This balanced signal sample and hold circuit requires only a single polarity sample pulse and has a common mode rejection.

It is therefore an object to provide an improved balanced sample and hold circuit.

It is another object to provide sample and hold circuit requiring only two diodes.

It is another object to provide a sample and hold circuit which does not require a pulse transformer for driving.

It is yet another object to provide a sample and hold circuit that is more readily used in monolithic integration and has a high degree of common mode of noise rejection.

These and other advantages, features, and objects of the invention will become more apparent from the following description taken in connection with the illustrative embodiment in the accompanying drawings.

DETAILED DESCRIPTION OF THE PREFERRED EMBODIMENT

Figure 1:
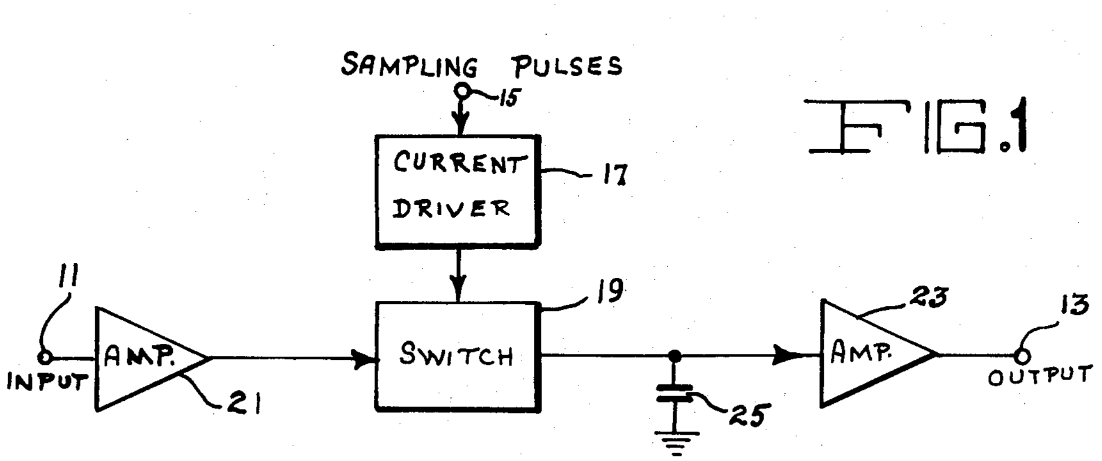
FIG. 1 is a functional block diagram of a conventional prior art sample and hold gate.

Referring to FIG. 1, there is shown a single block diagram of a conventional sample and hold circuit in which the input is applied at terminal 11 and it is desired to receive an output at terminal 13 upon the application of sampling pulses applied at terminal 15. The sampling pulses are fed first to current driver 17 and the output of current driver 17 activates switch 19. The input signal which is applied by amplifier 21 then passes through switch 19 and is amplified by amplifier 23 and made available at output terminal 13. The input signal is stored by holding capacitor 25.

Figure 2:
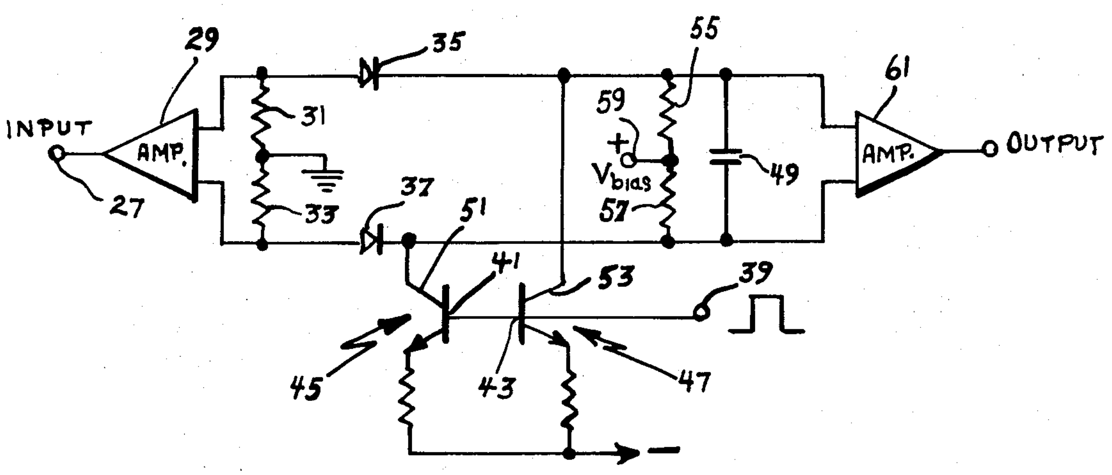
FIG. 2 is a circuit diagram of the balanced signal sample and hold circuit which is the embodiment of this invention.

Referring to FIG. 2, which is an embodiment of the invention, the input signal is applied to terminal 27 and is amplified by amplifier 29. Resistors 31 and 33 provide a load for the input amplifier 27 when the gate is off. The two diodes 35 and 37 perform the switching function, transmitting the input signal when they are on and blocking it when they are off. Diodes 35 and 37 are turned on when the positive portion of the sampling clock is applied at terminals 39 to bases 41 and 43 of transistors 45 and 47 which causes transistors 45 and 47 to draw current. At this time capacitor 49 is charged by input amplifier 29 and the input signal appears across it. When the sampling clock goes negative and transistors 45 and 47 stop drawing current, diodes 35 and 37 are essentially off since their anode are connected to input amplifier 29 and their cathode are connected to collectors 51 and 53 of transistors 45 and 47. Both collectors 51 and 53 of transistors 45 and 47 charge through resistors 55 and 57 which are very large and also charge through collector-substrate capacitance toward the bias applied at terminal 59. This maintains a reverse bias on diodes 35 and 37. Since both sides of capacitor 49 are charged simultaneously, the voltage across it is unchanged. The charging of collectors 51 and 53 is common mode and therefore only the last level of the input signal appears at the output of output amplifier 61. Resistors 55 and 57 are made large enough to prevent any appreciable discharge of capacitor 49 at this time.

What is claimed is:

1. A sample and hold circuit comprising:
   a. a pair of input terminals;
   b. a pair of output terminals;
   c. a pair of diodes, each having an anode and a cathode with the anode of each diode connected to one each of the input terminals and the cathode of each diode connected one each to the output terminals;
   d. a pair of transistors, each having a base, emitter, and collector with the collector of each transistor connected to one each of the cathodes of each diode;
   e. a control terminal connected to each base of the transistors;
   f. a capacitor connected in shunt with the output terminals;
   g. a source of bias potential; and
   h. a first pair of series resistors connected in parallel with the capacitor, the mutual junction of the first pair of series resistors being connected to the source of bias potential.
2. A sample and hold circuit according to claim 1 which further comprises a second pair of series resistors connected to the input terminals, with the mutual junction of the second pair of resistors being grounded.

* * * * *